United States Patent Office 3,488,405
Patented Jan. 6, 1970

3,488,405
BLENDS OF STYRENE-ACRYLONITRILE RESINS WITH GRAFT COPOLYMERS OF DIENE RUBBER SUBSTRATE AND HYDROXYLIC POLYMER SUPERSTRATE
Quirino A. Trementozzi, Springfield, Mass., Stanley E. Gebura, Overland Park, Kans., and Frederic J. Locke, East Longmeadow, Mass., assignors to Monsanto Company, St. Louis, Mo., a corporation of Delaware
No Drawing. Filed June 19, 1964, Ser. No. 376,580
Int. Cl. C08f 33/08; C08d 11/00
U.S. Cl. 260—876                    16 Claims

ABSTRACT OF THE DISCLOSURE

Disclosed herein are polymeric blends comprising (a) a graft copolymer comprising a diene rubber substrate polymer and a hydroxylic superstrate polymer in proportion of about 15 to 200 parts by weight of superstrate polymer per 100 parts by weight of substrate polymer, and (b) an interpolymer of a monovinylidene aromatic compound and an ethylenically unsaturated nitrile.

---

This invention relates to polyblends and more particularly to polyblends of (a) styrene-acrylonitrile type interpolymers and (b) graft copolymers comprising a diene rubber substrate polymer and a hydroxylic superstrate polymer.

An object of this invention is to provide novel polyblends.

Another object is the provision of a novel class of polyblends of styrene/acrylonitrile type interpolymers with graft copolymers containing hydroxyl groups.

A further object is the provision of methods for preparing such polyblends.

These and other objects are attained through the provision of blends comprising:

(A) a graft copolymer comprising a diene rubber substrate polymer and a hydroxylic superstrate polymer in proportion of about 15 to 200 parts by weight of superstrate polymer per 100 parts by weight of substrate polymer, and
(B) an interpolymer of a monovinylidene aromatic compound and an ethylenically unsaturated nitrile, said interpolymer having a specific viscosity of from about 0.04 to 0.15 as measured at 25° C. as a solution of 1% by weight of the interpolymer in dimethylformamide.

The following examples are presented in illustration of the invention and are not intended as limitations thereon. Where parts are mentioned, they are parts by weight unless otherwise specified.

EXAMPLE I.—PREPARATION OF GRAFT COPOLYMER LATICES

Part A

Prepare a series of diene rubber substrate polymer latices, A–T, according to the following polymerization recipe.

| Component: | Parts |
|---|---|
| Water | 250 |
| Diene | X |
| Comonomer(s) | Y |
| Divinylbenzene | 0.5 |
| Sodium stearate | 5 |
| Potassium persulfate | 0.3 |
| t-Dodecyl mercaptan | 0.4 |

Charge the water and soap to a suitable reaction vessel, deoxygenate the soap solution by boiling, cool under nitrogen, add the remaining components of the recipe, and heat with agitation at 50° C. to about 95% conversion of monomers to polymer. The nature and amount of the diene rubber and the comonomer(s) in each instance are shown in Table A, infra.

Part B

Prepare a series of graft copolymer latices, A–T, by adding varying amounts of ethylenically unsaturated alcohol and optional comonomer(s), together with 0.2 part of t-dodecyl mercaptan, to aliquots of diene rubber substrate polymer latices, A–T, prepared in Part A hereof, containing 100 parts of rubber solids and heating the reaction mixture at 70° C. with agitation until substantially all of the monomer mixture has polymerized. Stabilize each of the latices by adding 2 parts of a styrenated phenol antioxidant thereto. The nature and amount of the ethylenically unsaturated alcohol and the comonomer(s) in each instance are shown in Table A, infra. The graft copolymers in each instance are comprised of a diene/optional comonomer substrate with an ethylenically unsaturated alcohol/optional comonomer superstrate grafted thereto in the designated proportions:

TABLE A

| Graft copolymer latex | A-Diene rubber substrate polymer | | | | B-Hydroxylic superstrate polymer | | | | Parts B per 100 parts A |
|---|---|---|---|---|---|---|---|---|---|
| | Diene | Parts X | Comonomer(s) | Parts Y | Ethylenically unsaturated alcohol | Parts | Comonomer(s) | Parts | |
| A | Butadiene | (300) | None | | Vinyl benzyl alcohol. | (10) | Styrene/ Acrylonitrile. | 80/10 | 60 |
| B | do | (90) | Styrene | (10) | do | (10) | do | 80/10 | 60 |
| C | do | (90) | do | (10) | do | (10) | do | 70/20 | 60 |
| D | do | (90) | do | (10) | Phenyl allyl alcohol. | (10) | do | 70/20 | 60 |
| E | do | (75) | Styrene/vinyl benzyl alcohol. | (10/15) | Vinyl benzyl alcohol. | (10) | do | 70/20 | 60 |
| F | do | (75) | Styrene/phenyl allyl alcohol. | (10/15) | Phenyl allyl alcohol. | (10) | do | 70/20 | 60 |
| G | do | (80) | Vinyl benzyl alcohol. | (20) | Vinyl benzyl alcohol. | (10) | do | 70/20 | 40 |
| H | do | (80) | Phenyl allyl alcohol. | (20) | Phenyl allyl alcohol. | (10) | do | 70/20 | 50 |
| I | do | (90) | Styrene | (10) | Vinyl benzyl alcohol. | (20) | Styrene | (80) | 60 |
| J | do | (90) | do | (10) | Phenyl allyl alcohol. | (20) | do | (80) | 70 |
| K | do | (90) | do | (10) | Vinyl benzyl alcohol. | (100) | None | | 25 |
| L | do | (100) | None | | Phenyl allyl alcohol. | (100) | None | | 35 |
| M | Isoprene | (75) | Styrene | | 2-hydroxymethyl butadiene. | (25) | do | (100) | 90 |

TABLE A

| Graft copolymer latex | A-Diene rubber substrate polymer | | | | B-Hydroxylic superstrate polymer | | | | Parts B per 100 parts A |
|---|---|---|---|---|---|---|---|---|---|
| | Diene | Parts X | Comonomer(s) | Parts Y | Ethylenically unsaturated alcohol | Parts | Comonomer(s) | Parts | |
| N | Butadiene | (90) | Acrylonitrile | (10) | Vinyl benzyl alcohol | (10) | Styrene/Acrylonitrile | (80/10) | 40 |
| O | do | (90) | Styrene | (10) | Ethyl beta-hydroxyethyl fumarate | (20) | Vinyl chloride | (80) | 50 |
| P | do | (90) | do | (10) | Bis-(betahydroxyethyl)fumarate | (25) | Methyl methacrylate | (75) | 30 |
| Q | do | (90) | do | (10) | Betahydroxyethyl acrylate | (10) | Ethyl acrylate | (90) | 60 |
| R | do | (90) | do | (10) | Ethyl beta-hydroxyethyl fumarate | (77) | Butene-1 | (23) | 30 |
| S | do | (90) | do | (10) | Phenyl allyl alcohol | (25) | Butadiene | (75) | 40 |
| T | do | (80) | Styrene/vinyl benzyl alcohol | (10/10) | Vinyl benzyl alcohol | (25) | do | (75) | 50 |

EXAMPLE II.—PREPARATION OF POLYBLENDS

Prepare a series of polyblends, as listed in Table B, infra, by blending together, (a) each of the hydroxylated graft copolymer latices prepared in Exchange I and listed in Table A, (b) a styrene-acrylonitrile (80:20) copolymer emulsion containing 35% solids by weight and having a specific viscosity of about 0.08, as measured as a solution of 0.1% by weight of the copolymer in dimethylformamide at 25° C., and (c) 2 parts, per 100 parts of diene rubber substrate polymer contained in the hydroxylated graft copolymer, of a mixture of styrenated phenols as antioxidant. The proportions of (a) and (b) employed in each instance are shown in Table B. The emulsion mixture is then precipitated by slowly adding 1 liter portions of each latex to 3 liters, in each instance, of a 5% by weight aqueous magnesium sulfate solution. The coagulated solids are recovered by filtration and dried under vacuum at 40° C.

TABLE B

| Ex. | Hydroxylated Graft Copolymer (see Table A) | Parts of Hydroxylated Graft Copolymer | Parts of Styrene/Acrylonitrile Copolymer |
|---|---|---|---|
| IIa | A | 10.0 | 90.0 |
| IIb | B | 18.5 | 81.5 |
| IIc | B | 24.0 | 76.0 |
| IId | C | 18.5 | 81.5 |
| IIe | C | 24.0 | 76.0 |
| IIf | D | 18.5 | 81.5 |
| IIg | D | 24.0 | 24.0 |
| IIh | E | 50.0 | 50.0 |
| IIi | F | 75.0 | 25.0 |
| IIj | G | 30.0 | 70.0 |
| IIk | H | 25.0 | 75.0 |
| IIl | I | 25.0 | 75.0 |
| IIm | J | 15.0 | 85.0 |
| IIn | K | 15.0 | 85.0 |
| IIo | L | 15.0 | 85.0 |
| IIp | M | 15.0 | 85.0 |
| IIq | N | 15.0 | 85.0 |
| IIr | O | 5.0 | 95.0 |
| IIs | P | 15.0 | 85.0 |
| IIt | Q | 15.0 | 85.0 |
| IIu | R | 15.0 | 85.0 |
| IIv | S | 15.0 | 85.0 |
| IIw | T | 15.0 | 85.0 |

EXAMPLE III

The polyblends prepared in Examples IIIa–IIg are tested for tensile impact, modulus, stress and elongation at yield and stress and elongation at fail using standard dog-bone test bars measuring 0.115 inch by 0.125 inch at the waist and employing the conventional ASTM procedures designated in Table C, infra. The test results are also shown in Table C.

HYDROXYLATED GRAFT COPOLYMERS

The hydroxylated graft copolymers of this invention are prepared by polymerizing from about 15 to 200 parts by weight of superstrate monomer in an aqueous dispersion containing 100 parts by weight of the diene rubber polymer which will form the substrate of the hydroxylated graft copolymer. The aforesaid superstrate monomer comprises an ethylenically unsaturated alcohol in optional admixtures with one more copolymerizable ethylenically unsaturated monomers, one of which may be a nitrile monomer, in proportions of from about 1 to 100% by weight of the ethylenically unsaturated alcohol, from zero to about 60% by weight of the ethylenically unsaturated nitrile, and from zero to about 95% by weight of other copolymerizable ethylenically unsaturated monomers. The preferred hydroxylated graft copolymers are those prepared by polymerizing from about 20 to 90 parts, and particularly 40 to 80 parts, of superstrate monomer(s) per 100 parts of diene rubber polymer.

The graft copolymerization reaction is conducted with agitation at a temperature at which the initiator in the system initiates copolymerization of the superstrate monomer(s), usually a temperature of 40–100° C. Supplementary polymerization initiator may be added to the system to insure substantially complete conversion of the monomer charge to polymer, but this supplementary initiator is frequently unnecessary because of the ability of unconsumed initiator remaining from the preparation of the diene rubber polymer and/or active sites on the chain of the diene rubber polymer to initiate polymerization of the monomer charge.

The reaction is preferably conducted in the substantial absence of any emulsifying agent added to the preformed diene rubber polymer latex because of the effect of added emulsifying agent in decreasing grafting efficiency. The emulsifying agent already present in the diene rubber polymer latex is usually sufficient to act as a dispersing agent for the graft copolymerization reaction. If desired, however, up to about 2% of emulsifying agent, based on the weight of the superstrate monomer mixture can be added to the aqueous dispersion. The observance of this precaution with regard to added emulsifying agent permits the attainment of high grafting efficiency. As a result, the graft copolymers generally have at least 80% of the superstrate chemically-combined with the substrate. Since no unreacted rubber can be extracted from the graft copolymer, it appears that all of the diene rub- TABLE C
[Refer to Tables A and B for compositions]

| Example | ASTM-D1822 tensile impact (ft.-lbs./sq. in.) | ASTM-D638 | | | | |
|---|---|---|---|---|---|---|
| | | Modulus (p.s.i.) | Yield | | Fail | |
| | | | Stress (p.s.i.) | Elongation (percent) | Stress (p.s.i.) | Elongation (percent) |
| IIb | 40.4 | 189,000 | 5,850 | 3.5 | 5,850 | 16.5 |
| IIc | 58.3 | 192,000 | 5,570 | 3.7 | 5,450 | 22.0 |
| IId | 38.3 | 206,000 | 5,770 | 3.4 | 5,830 | 18.0 |
| IIe | 44.8 | 168,000 | 5,220 | 3.9 | 5,220 | 25.0 |
| IIf | 45.7 | 182,000 | 5,680 | 4.0 | 5,950 | 20.0 |
| IIg | 62.3 | 162,000 | 4,810 | 4.5 | 5,200 | 30.0 | ber polymer becomes chemically-combined with the superstrate.

Optional additives, such as chain transfer agents and stabilizers, can be included in the graft copolymerization reaction mixture when desired.

HYDROXYLATED GRAFT COPOLYMER SUPERSTRATE

The superstrate of the hydroxylated graft copolymer comprises (a) from about 1 to 100% and preferably from about 5 to 25%, by weight of a chemically-combined ethylenically unsaturated alcohol, (b) from zero to about 60%, preferably from zero to about 30%, by weight of a chemically-combined ethylenically unsaturated nitrile and (c) from zero to about 95%, and preferably from about 40 to 90%, by weight of other chemically-combined copolymerizable ethylenically unsaturated monomer(s).

The ethylenically unsaturated alcohols suitable for use are ethylenically unsaturated mono- and polyhydroxylic monomers. If desired, other functional groups than hydroxyl may be present in the monomer structure. Thus, these alcohols may be selected from a wide class of materials including aromatic alcohols such as, e.g., vinyl benzyl alcohol, 2-phenyl allyl alcohol, vinyl betahydroxyethyl benzene, betahydroxyethyl styrene, etc.; aliphatic alcohols such as, e.g., 3-hydroxy butene-1, allyl alcohol, 4-hydroxy pentene-1, methallyl alcohol, 2-hydroxymethyl allyl alcohol, 2-chloromethyl allyl alcohol, etc.; hydroxylic dienes such as, e.g., 2-hydroxymethyl butadiene-1,3, 2,3 - bis - (hydroxymethyl)butadiene-1,3, etc.; hydroxylic mono- and poly-carboxylic acid esters such as, e.g., ethyl betahydroxyethyl fumarate, bis-(betahydroxyethyl) fumarate, betahydroxyethyl acrylate, butyl betahydroxypropyl fumarate, betahydroxypropyl methacrylate, betahydroxypropyl crotonate, bis - (betahydroxyethyl) itaconate, ethyl betahydroxyethyl maleate, alphahydroxymethyl methylacrylate, etc.; hydroxylic mono- and polycarboxylic acids such as, e.g., alphahydroxymethyl acrylic acid, alphahydroxymethyl crotonic acid, hydroxymethyl fumaric acid, hydroxypropyl maleic acid, etc.; hydroxylic amino and amido monomers such as, e.g., alphahydroxymethyl acrylamide, N-hydroxymethyl acrylamide, N-hydroxymethyl maleimide, N-betahydroxypropyl maleimide, betahydroxyethyl acrylamide, 2 - hydroxymethyl allyl amine, etc.; alphahydroxymethyl acrylonitrile; etc. Various of these alcohols are employed in the examples, but may be replaced, with equivalent results, with any of the other alcohols characterized above, or mixtures thereof.

Ethylenically unsaturated nitriles suitable for use are acrylonitrile, methacrylonitrile, and mixtures thereof.

The copolymerizable ethylenically unsaturated monomer(s) suitable for use are selected from a wide class of vinyl and vinylidene monomers including olefins such as, e.g., ethylene, propylene, isobutylene, 3-methyl butene-1, butene-1, pentene-1, etc., mono- and polycarboxylic acid esters such as, e.g., methyl methacrylate, ethyl acrylate, diethyl maleate, etc.; mono- and polycarboxylic acids or anhydrides such as, e.g., acrylic acid, methacrylic acid, crotonic acid, fumaric acid, maleic acid, maleic anhydride, itaconic acid, etc.; vinyl and vinylidene halides such as, e.g., vinyl chloride, vinyl bromide, vinylidene chloride, etc. Particularly preferred are the monovinylidene aromatic compounds such as styrene; and substituted alkyl styrenes such as, e.g., ortho-, meta- and para-methylstyrenes, 2,4-dimethylstyrene, para-ethyl styrene, etc.; aryl substituted halo-styrenes such as, e.g., ortho-, meta- and para-chlorostyrenes or bromostyrenes, 2,4-dichlorostyrene, 2-methyl-4-chlorostyrene, etc.; mixtures thereof with one another; and mixtures thereof with alphamethylstyrene. When alphamethylstyrene-containing mixtures are employed, the components should be proportioned such that the alphamethylstyrene does not constitute more than about 70% of the total weight of the superstrate-forming monomers. Various of the ethylenically unsaturated monomers hereinabove defined are employed in the examples, but may be replaced, with equivalent results, with any of the other monomers characterized above, or mixtures thereof.

HYDROXYLATED GRAFT COPOLYMER SUBSTRATE

The substrate of the hydroxylated graft copolymer is a diene rubber polymer which comprises, (a) from about 40 to 100% and preferably from about 75 to 100%, by weight of a chemically-combined conjugated diene and (b) from zero to about 60%, and preferably zero to about 25%, by weight of other chemically-combined ethylenically unsaturated monomer(s).

Conjugated dienes suitable for use are butadiene, isoprene, and mixtures thereof.

The copolymerizable ethylenically unsaturated monomer(s) suitable for use are selected from a wide class of vinyl and vinylidene monomers as defined above in conjunction with the superstrate monomers. In a preferred embodiment, the substrate will comprise the conjugated diene in chemical combination with, as the copolymerizable monomer, an ethylenically unsaturated alcohol or a monovinylidene aromatic compound, both as heretofore defined. In a particularly preferred embodiment, both an ethylenically unsaturated alcohol and a monovinylidene aromatic compound, and especially styrene, will be employed. In this last embodiment, the diene rubber polymer substrate will comprise (a) from about 40 to 99%, and preferably from about 75 to 99%, by weight of the chemically-combined conjugated diene, (b) from about 1 to 60%, and preferably from about 1 to 25%, by weight of the chemically-combined hydroxylic monomer and (c) from about 1 to 60%, and preferably from about 1 to 25%, by weight of the monovinylidene aromatic compound.

This invention is not limited in the manner of manufacture of the diene rubber polymer. The examples show free radical polymerization in aqueous systems but equally satisfactory results are obtained using, e.g., anionic or cationic catalysis in aqueous or organic systems. In this way, diene rubbers may be made from monomer combinations which do not readily polymerize by e.g., free radical mechanism. Similarly, monomers which do not copolymerize readily with butadiene or isoprene can be used in conjunction with other copolymerizable monomers capable of copolymerization with both to form, e.g., terpolymers.

Thus, in various embodiments the copolymerizable ethylenically unsaturated monomer(s) may be olefins such as, e.g., ethylene, propylene, isobutylene, 3-methyl butene-1, butene-1, pentene-1; etc.; mono- and poly-carboxylic acid esters such as, e.g., methyl methacrylate, ethyl acrylate, diethyl maleate, etc.; mono- and polycarboxylic acids or anhydrides such as, a.g., acrylic acid, methacrylic acid, crotonic acid, fumaric acid, maleic acid, maleic anhydride, itaconic acid, etc.; vinyl and vinylidene halides such as e.g., vinyl chloride, vinyl bromide, vinylidene chloride, etc.; monovinylidene aromatic compounds such as styrene; aryl substituted alkyl styrenes such as, e.g., ortho-, meta- and para-methylstyrenes, 2,4-dimethylstyrene, para-ethyl styrene, etc.; aryl substituted halostyrenes such as, e.g., ortho-, meta- and para-chlorostyrenes or bromostyrenes, 2,4-dichlorostyrene, 2-methyl-4-chlorostyrene, etc.; aromatic alcohols such as, e.g., vinyl benzyl alcohol, 2-phenyl allyl alcohol, vinyl betahydroxyethyl benzene, betahydroxyethyl styrene, etc.; aliphatic alcohols such as, e.g., 3-hydroxy butene-1, allyl alcohol, 4-hydroxy pentene-1, methallyl alcohol, 2-hydroxy-methyl allyl alcohol, 2-chloromethyl allyl alcohol, etc.; hydroxylic dienes such as, e.g., 2-hydroxymethyl butadiene-1,3, 2,3 - bis - (hydroxymethyl)butadiene-1,3, etc.; hydroxylic mono- and poly- carboxylic acid esters such as, e.g., ethyl betahydroxyethyl fumarate, bis-(betahydroxyethyl)fumarate, betahydroxyethyl acrylate, butyl betahydroxypropyl fumarate, betahydroxypropyl methacrylate, betahydroxypropyl crotonate, bis-(betahydroxyethyl)itaconate, ethyl betahydroxyethyl maleate, alphahydroxymethyl methacrylate, etc.; hydroxylic mono- and poly-carboxylic acids such as, e.g., alphahydroxy-methyl acrylic acid, alphahydroxymethyl crotonic acid, hydroxymethyl fumaric acid, hydroxypropyl maleic acid, etc.; hydroxylic amino and amido monomers such as, e.g., alphahydroxymethyl acrylamide, N-hydroxymethyl acrylamide, N-hydroxymethyl maleimide, N-betahydroxypropyl maleimide, betahydroxyethyl acrylamide, 2-hydroxymethyl allyl amine, etc.; alphahydroxymethyl acrylonitrile; etc. Various of the ethylenically unsaturated monomers hereinabove defined are employed in the examples, but may be replaced, with equivalent results with any of the other monomers characterized above, or mixtures thereof.

If desired, a chemical cross-linking agent can be used in the preparation of the substrate polymer. Generally, amounts of up to about 5% based on the weight of the rubber-forming monomers is sufficient. Cross-linking agent contents of 0.5-1.25% are particularly advantageous. Any cross-linking agent capable of reacting with the rubber-forming monomers can be used in the practice of the invention. Such cross-linking agents are, of course, already well known and include, e.g., divinylbenzene, diallyl maleate, diallyl fumarate, diallyl adipate, diallyl phthalate, allyl acrylate, allyl methacrylate, diacrylates and dimethacrylates of polyhydric alcohols, e.g., ethylene glycol dimethacrylate, etc.

In preparing the hydroxylated graft copolymers, the diene rubber polymers are usually employed in the form of freshly-prepared latices or latices which have been stored in an inert atmosphere. These latices can be prepared by any of the aqueous emulsion polymerization techniques conventionally utilized for the preparation of such latices. Generally, the monomers are emulsified in water with the aid of about 2-7%, based on the weight of the monomers, of a micelle-forming emulsifying agent and polymerized at 0-80° C. in the presence of a water-soluble free radical polymerization initiator or redox catalyst. The reaction mixture can, and usually does, also contain a chain transfer agent, e.g., a higher alkyl mercaptan such as dodecyl mercaptan.

INTERPOLYMER

The monovinylidene aromatic compound-unsaturated nitrile interpolymers which are blended with the hydroxylated graft copolymers in accordance with the present invention consist of 20-95%, preferably 60-85%, by weight of a chemically-combined monovinylidene aromatic compound and 80-5%, preferably 40-15%, by weight of a chemically-combined unsaturated nitrile. Utilizable interpolymers have specific viscosities ranging from 0.04 to about 0.15 measured as a solution of 0.1% of the interpolymer in dimethylformamide at 25° C. The amount of interpolymer blended with the hydroxylated graft copolymer is such that the substrate of the hydroxylated graft copolymer constitutes 5-60%, preferably 10-40%, by weight of the polyblend.

Monovinylidene aromatic compounds and unsaturated nitriles suitable for use in preparing the interpolymers are the same as those already listed as suitable for use in preparing the superstate of the hydroxylated graft copolymer. According to a preferred embodiment of the invention, the monovinylidene aromatic compound and unsaturated nitrile are combined in the interpolymer in substantially the same proportions as in the graft copolymer superstrate. The interpolymers can be prepared by any of the mass, solution, emulsion, or suspension polymerization techniques conventionally employed for the preparation of such interpolymers.

The polyblends may be prepared by blending latices of the hydroxylated graft copolymer and the interpolymer and recovering the polymers from the mixed latices by any suitable means, e.g., drum-drying, spray-drying, coagulating, etc. Preferably they are prepared by simply comalaxating a mixture of the interpolymer and the hydroxylated graft copolymer at an elevated temperature for a period of time sufficient to provide an intimate fusion blend of the polymers. The fact that blends of the hydroxylated graft copolymer and the interpolymer can be prepared by simply blending the two polymers together on conventional plastics working equipment, such as rubber mills, screw extruders, etc., is a matter of considerable importance.

The blends of the hydroxylated graft copolymer and the interpolymer can be employed in the manufacture of high strength injection moldings, in the manufacture of extruded sheets, and in the manufacture of other high strength articles by methods well known in the art.

It is obvious that many variations can be made in the products and processes set forth above without departing from the spirit and scope of this invention.

What is claimed is:
1. A blend comprising:
 (A) a graft copolymer comprising a diene rubber substrate polymer and a hydroxylic superstrate polymer in proportion of about 15 to 2000 parts by weight of superstrate polymer per 100 parts by weight of substrate polymer, and
 (B) an interpolymer of a monovinylidene aromatic compound and an ethylenically unsaturated nitrile, said interpolymer having a specific viscosity of from about 0.05 to 0.1 as measured at 25° C. as a solution of 0.1% by weight of the interpolymer in dimethylformamide,
in proportions of (A) and (B) such that the substrate polymer of the graft copolymer constitutes from about 5 to 60% by weight of the blend; said substrate polymer being a rubbery polymer of from about 40 to 100% by weight of a conjugated diene selected from the group consisting of butadiene, isoprene, and mixtures thereof, and, correspondingly, from about 60 to zero percent by weight of at least one vinylidene monomer copolymerizable with said conjugated diene; said superstrate polymer being a polymer of (a) from about 1 to 100% by weight of an ethylenically unsaturated alcohol, (b) from zero to about 50% by weight of an ethylenically unsaturated nitrile and (c) from zero to about 95% by weight of at least one vinylidene monomer interpolymerizable therewith.

2. A blend as in claim 1 wherein component (B) is an interpolymer of styrene and acrylonitrile.

3. A blend as in claim 1 wherein the substrate polymer of the graft copolymer is an interpolymer of butadiene and styrene.

4. A blend as in claim 3 wherein component (B) is an interpolymer of styrene and acrylonitrile.

5. A blend as in claim 1 wherein the substrate polymer of the graft copolymer is an interpolymer of butadiene, styrene and vinyl benzyl alcohol.

6. A blend as in claim 5 wherein component (B) is an interpolymer of styrene and acrylonitrile.

7. A blend as in claim 1 wherein the substrate polymer of the graft copolymer is an interpolymer of butadiene, styrene and phenyl allyl alcohol.

8. A blend as in claim 7 wherein component (B) is an interpolymer of styrene and acrylonitrile.

9. A blend as in claim 1 wherein the substrate polymer of the graft copolymer is an interpolymer of butadiene and styrene and the hydroxylic superstrate polymer is an interpolymer of (a) from about 1 to 100% by weight of vinyl benzyl alcohol, (b) from zero to about 50% by weight of acrylonitrile and (c) from zero to about 95% by weight of styrene.

10. A blend as in claim 9 wherein component (B) is an interpolymer of styrene and acrylonitrile.

11. A blend as in claim 1 wherein the substrate polymer of the graft copolymer is an interpolymer of butadiene and styrene and the hydroxylic superstate polymer is an interpolymer of (a) from about 1 to 100% by weight of phenyl allyl alcohol, (b) from zero to about 50% by weight of acrylonitrile and (c) from zero to about 95% by weight of styrene.

12. A blend as in claim 11 wherein component (B) is an interpolymer of styrene and acrylonitrile.

13. A blend as in claim 1 wherein the substrate polymer of the graft copolymer is an interpolymer of butadiene, styrene and vinyl benzyl alcohol and the hydroxylic superstrate polymer is an interpolymer of (a) from about 1 to 100% by weight of vinyl benzyl alcohol, (b) from zero to about 50% by weight of acrylonitrile and (c) from zero to about 95% by weight of styrene.

14. A blend as in claim 13 wherein component (B) is an interpolymer of styrene and acrylonitrile.

15. A blend as in claim 1 wherein the substrate polymer of the graft copolymer is an interpolymer of butadiene, styrene and phenyl allyl alcohol and the hydroxylic superstrate polymer is an interpolymer of (a) from about 1 to 100% by weight of phenyl allyl alcohol, (b) from zero to about 50% by weight of acrylonitrile and (c) from zero to about 95% by weight of styrene.

16. A blend as in claim 15 wherein component (B) is an interpolymer of styrene and acrylonitrile.

References Cited

UNITED STATES PATENTS

| | | | |
|---|---|---|---|
| 2,802,808 | 8/1957 | Hayes | 260—876 |
| 2,900,359 | 8/1959 | Chapin et al. | 260—80.75 XR |
| 2,951,831 | 9/1960 | Reinhard et al. | |
| 3,038,890 | 6/1962 | Abramo et al. | 260—82.1 |
| 3,069,399 | 12/1962 | Abramo et al. | 260—80.75 |
| 3,073,798 | 1/1963 | Baer | 260—876 |
| 3,119,785 | 1/1964 | Van Gils | 260—879 |
| 3,201,374 | 8/1965 | Simms | 260—80.75 |
| 3,255,276 | 6/1966 | Winter et al. | 260—897 |
| 3,260,772 | 7/1966 | Cummings | 260—876 |

MURRAY TILLMAN, Primary Examiner

K. E. KUFFNER, Assistant Examiner

U.S. Cl. X.R.

260—879, 880

PO-1050
(5/69)

UNITED STATES PATENT OFFICE
CERTIFICATE OF CORRECTION

Patent No. 3,488,405                    Dated January 6, 1970

Inventor(s) Q. A. Trementozzi et al.

It is certified that error appears in the above-identified patent and that said Letters Patent are hereby corrected as shown below:

Table A, Graft Copolymer Latex A Butadiene "(300)" should read --- (100) ---. Column 3, line 21, "Exchange" should read --- Example ---. Column 4, line 27, "admixtures" should read --- admixture ---; "one more" should read, --- one or more ---. Claim 1, line 4, "2000" should read --- 200 ---.

SIGNED AND
SEALED
JUN 23 1970

(SEAL)
Attest:

Edward M. Fletcher, Jr.
Attesting Officer

WILLIAM E. SCHUYLER, JR.
Commissioner of Patents